Patented Mar. 13, 1951

2,544,725

UNITED STATES PATENT OFFICE 2,544,725

METHOD OF REFINING GLYCERIDE OILS

Theodore H. Rider, Hinsdale, and Solomon D. Gershon, Chicago, Ill., assignors to Lever Brothers Company, Cambridge, Mass., a corporation of Maine No Drawing. Application May 19, 1947, Serial No. 749,083

8 Claims. (Cl. 260—420)

This invention relates to a method of refining or purifying an oil.

It is well known that oils contain small amounts of dissolved non-fatty materials which are believed to be gums, phosphoproteins and similar components. Many processes have been proposed for refining oils to remove such non-fatty components. In general these processes involve washing the oil with water or treating the oil with various chemicals in aqueous solution such as caustic, salts, acids, etc., and separating the oil phase from the aqueous phase, e. g., by stratification and decanting, or by centrifugation. In some instances the oil is treated with solid adsorbents. In these processes, the chemical used to facilitate the removal of the non-fatty components from the oil is usually added to the aqueous treating phase. At least it is usually selected so that it does not remain as an inseparable component in the oil, and the same is true when solid adsorbents are used. This is understandable, because the purpose of refining the oil is to purify it, and the addition of some other material to the oil would usually defeat the purpose of the refining process.

It has been discovered in accordance with the invention that an oil-soluble emulsifier may be added to the oil before the refining thereof, and that the presence of such an emulsifier in the oil will facilitate the removal of the gums and other non-fatty components when the oil is treated with water. The oil-soluble emulsifier remains in the oil after the refining process and is a desirable component thereof when the oil is used for the purposes contemplated.

For example, when an oil is to be used in the manufacture of a salad dressing of the French dressing type, which contains both an oil phase and an aqueous phase, it is desirable to have a clear, sharp interface between the oil phase and the aqueous phase. Especially is this so if the product is to be marketed in a glass container, as is customary. Oils which have been refined by the conventional processes, when used in the manufacture of products such as a French dressing having an oil phase and an aqueous phase, tend to form a third phase between the oil phase and the water phase. This third phase may include a small amount of materials extracted from the oil. These materials which accumulate in the third phase may be solid or appear as solids and may have a color different than that of the oil phase or water phase. As a result, the accumulation of such material in the intermediate phase detracts from the appearance of the composition. While the formation of the third phase may not seriously interfere with the intended use of the composition, the user may obtain the impression that the composition is deteriorating in some way.

Another use for oils which may be refined in accordance with the invention is in the formulation of a hair dressing, containing an oil phase and an aqueous phase, which can be formed into an emulsion upon shaking and which upon standing stratifies into two separate oil and water phases. In such a composition it is desirable to maintain a clear interface between the oil phase and the water phase throughout the life of the composition. In such a composition the accumulation of a third phase is very undesirable.

It is an object of the invention, therefore, to refine an oil in such a way as to remove components from the oil during the refining, which if otherwise were permitted to remain in the oil after it is formulated into a water-containing composition, would gradually separate as an undesirable third phase in the composition.

It is a further object of the invention to accomplish this by the admixture of the oil with an oil-soluble emulsifier prior to the refining operation, said emulsifier remaining in the oil and being a desirable component in the oil used in the final composition.

This object will be better understood when it is considered, for example, that the refined oil may be used in a French dressing. The emulsifier remaining in the oil after the refining, serves the additional function of facilitating the emulsion of the oil and the aqueous phase when the composition is agitated preparatory to using it.

The oil that may be purified in accordance with the invention may be any glyceride oil, such as a vegetable oil extracted from natural sources. Examples are olive oil, cottonseed oil, soybean oil, peanut oil, linseed oil, castor oil, coconut oil, etc. The invention finds particular application to the so-called edible oils, such as olive oil, which are of the non-drying or semi-drying type. Animal oils such as fish oils similarly may be purified.

In carrying out the invention a small amount of an oil-soluble emulsifier is added to the oil. Since the emulsifier is readily miscible with the oil it does not alter its physical properties to any appreciable extent. After the emulsifier has been added to the oil, the oil is thoroughly agitated and mixed with water, following which the water is separated in known manner, e. g., by stratification and decanting, or by centrifugation. If desired the mixture may be saturated with carbon dioxide in known manner before the separation. The treatment with water may be repeated once or as many times as desired. During this refining treatment the non-oil components of the oil, which are believed to be gums, phosphoproteins and other non-fatty components, separate from the oil into the water phase. The treatment may be repeated until all of the components of this type are removed from the oil or at least as much of them as required so that a clear interface is formed when the oil is used in a composition with an aqueous phase. The components removed in this refining process are those which if left in the oil would form the undesirable contaminating third phase between the oil and water phases in the finished product. The oil refined in this manner is free from these contaminating characteristics irrespective of the extent of the use of an aqueous composition containing it.

It is believed that the presence of the emulsifier in the oil during the refining with water is largely responsible for the separation of the impurities in the water phase during the refining, since if the oil without the emulsifier is treated with water to the same extent, these impurities are not separated or at least not enough of them are separated to prevent the formation of a contaminating third phase in an emulsifiable composition.

The presence of a carbon dioxide facilitates the removal of the impurities. However this is an optional feature and is not essential in practicing invention.

The emulsifier should be soluble in the vegetable oil to be refined. In addition, the emulsifier should be of such a type as will be desirable in the oil after refining. In general, all of the compounds falling within the definition are oil-soluble and are not toxic and therefore may be components in an edible oil or an oil to be used for application to the body such as in the formulation of a hair dressing.

The emulsifier is a partial fatty acid ester of a polyhydroxy aliphatic compound containing at least one free hydroxyl group. Examples of such emulsifiers are the so-called monoglycerides or diglycerides, i. e., glycerin in which one or two of the hydroxy groups have been acylated with the fatty acid to leave at least one free hydroxyl. Other polyhydroxy compounds which similarly may be partially acylated with a higher fatty acid include the hexoses and polyhexoses, i. e., sugars, sugar alcohols such as mannitol and sorbitol; hexitol anhydrides such as sorbitans, sorbides, mannitans and mannides. Examples include sorbitan monolaurate, monostearate, mono-oleate, dioleate, etc. These are oily liquids or waxy solids miscible with oil. Other examples include mannitol mono-oleate or dipalmitate, the sorbitol monostearate or trioleate. The partial fatty acid esters of polyalcohols, such as polyglycols and polyglycerols may also be used. The upper molecular weight of any of these compounds would be dependent upon the solubility properties, i. e., the molecular weight should not be so high as to render the compound insoluble in the vegetable oil.

A type of oil-soluble emulsifier which has been found to be particularly effective are the partial fatty acid esters of polyalkylene oxide derivatives of a polyol in which the fatty acid radicals are less in number than the free hydroxy groups in the partial ester. The alkylene radical contains two to four carbon atoms, inclusive. The polyol is defined as a hexose, a polyhexose, a hexitol, a polyhexitol or other aliphatic compound of carbon hydrogen and oxygen containing 6 to 12 carbon atoms, inclusive, and a plurality of hydroxy groups.

For example, propylene glycol glycoside, when treated with ethylene oxide, reacts to introduce hydroxyethyl groups through an ether linkage by reaction through the hydroxy groups of the glycoside. The number of such ethanol groups depends upon the proportions of the reactants and is not critical. The partial fatty acid ester is formed by esterifying one or more of the hydroxy groups with fatty acid radicals. Any hexose or polyhexose may be the basis of the glycoside. Preferably the derivative is the partial fatty acid ester of a polyethylene oxide derivative of propylene glycol glucoside in which the number of fatty acid radicals is less than the number of free hydroxy groups in the partial ester. This composition is available commercially.

The oil-soluble emulsifier for which a preference is expressed may be a mixture, and small amounts of other ingredients may be formed and included, such as the partial fatty acid esters: of polyglycols, of hydroxy ethylene (ethanol) ethers of propylene glycol glycosides of polyglucosides, and of hydroxy ethylene ethers of polyglucose. The primary component, however, is the partial fatty acid ester of hydroxy ethylene ether of propylene glycol glucoside.

The fatty acid used in forming the partial ester may be any fatty acid having 12 or more carbon atoms and may be saturated or unsaturated, such as lauric, myristic, palmitic, oleic, and stearic acids. These are referred to as "higher fatty acids." A preference is expressed for oleic acid since this gives the emulsifier optimum solubility properties in the oil.

The amount of the oil-soluble emulsifier will vary somewhat with the exact compound or composition and the number of the free hydroxy groups in the compound. The amount will also depend somewhat on the rapidity with which the oil is to be refined, i. e., the number of water treatments and the length of the treatments, and also the amount of the emulsifier desired in the oil product. This, in turn, will depend upon the emulsifying characteristics desired in the final product. In general amounts within the range of ½ to 10% may be used, and preferably about 3 to 5%. Because the oil and water are separated from each other following the agitation of the oil and emulsifier with the water, the amount of emulsifier is not more than that which will permit the separation of the oil and water following the mixing as described.

If the oil is to contain an oil-soluble antioxidant such as a tocopherol, this may be added to the oil prior to the refining since any components of the antioxidant which would contribute towards contamination of the interface may also be removed during the refining process. The same suggestion applies to any oil-soluble component which may be included in the final oil composition such as flavoring materials, perfumes, coloring material, etc.

The above description represents a preferred embodiment of the invention together with such variations as may be made therein without departing from the essential features of the process and all such modifications and variations are

We claim:

1. A process of refining a glyceride oil containing dissolved undesirable impurities, which comprises adding to said oil an amount in the range of 0.5 to 10% of an oil soluble partial higher fatty acid ester of a polyhydroxy aliphatic compound containing at least one free hydroxyl group, then mixing water therewith, and then separating the aqueous phase from the refined oil phase, said aqueous phase containing undesirable impurities removed from the oil, and said refined oil phase containing said ester.

2. A process of refining a glyceride oil containing dissolved undesirable impurities, which comprises adding to said oil an amount in the range of 0.5 to 10% of an oil soluble partial higher fatty acid ester of a polyhydroxy aliphatic compound containing at least one free hydroxyl group, then mixing water therewith, saturating the mixture with carbon dioxide, and then separating the aqueous phase from the refined oil phase, said aqueous phase containing undesirable impurities removed from the oil, and said refined oil phase containing said ester.

3. A process of refining a vegetable oil containing dissolved undesirable impurities, which comprises adding to said oil an amount in the range of 0.5 to 10% of an oil soluble partial higher fatty acid ester of a polyhydroxy aliphatic compound containing at least one free hydroxyl group, then mixing water therewith, and then separating the aqueous phase from the refined oil phase, said aqueous phase containing undesirable impurities removed from the oil, and said refined oil phase containing said ester.

4. A process of refining a vegetable oil containing dissolved undesirable impurities, which comprises adding to said oil an amount in the range of 0.5 to 10% of an oil soluble partial higher fatty acid ester of a polyalkylene oxide derivative of a propylene glycol glucoside wherein the number of free hydroxyl groups exceeds the number of fatty acid groups, said alkylene group containing 2 to 4 carbon atoms, then mixing water therewith, and then separating the aqueous phase from the refined oil phase, said aqueous phase containing undesirable impurities removed from the oil, and said refined oil phase containing said ester.

5. A process of refining olive oil containing dissolved undesirable impurities, which comprises adding to said oil an amount in the range of 0.5 to 10% of an oil soluble partial higher fatty acid ester of a polyalkylene oxide derivative of a propylene glycol glucoside wherein the number of free hydroxyl groups exceeds the number of fatty acid groups, said alkylene group containing 2 to 4 carbon atoms, then mixing water therewith, and then separating the aqueous phase from the refined oil phase, said aqueous phase containing undesirable impurities removed from the oil, and said refined oil phase containing said ester.

6. In a process of refining a glyceride oil containing dissolved undesirable impurities, in which process the oil is mixed with water, and then the aqueous phase is separated from the oil phase by stratification and decanting, the improvement which comprises adding to the oil before mixing the said oil with the water 3 to 5% of a partial higher fatty acid ester of a polyalkylene oxide derivative of a propylene glycol glucoside wherein the number of free hydroxyl groups exceeds the number of fatty acid groups, said alkylene group containing 2 to 4 carbon atoms, whereby the glyceride oil is more readily and thoroughly freed of the undesirable impurities and the refined oil phase contains said ester.

7. In a process of refining a glyceride oil containing dissolved undesirable impurities, in which process the oil is mixed with water, and then the aqueous phase is separated from the oil phase by centrifugation, the improvement which comprises adding to the oil before mixing the said oil with the water 3 to 5% of a partial higher fatty acid ester of a polyalkylene oxide derivative of a propylene glycol glucoside wherein the number of free hydroxyl groups exceeds the number of fatty acid groups, said alkylene group containing 2 to 4 carbon atoms, whereby the glyceride oil is more readily and thoroughly freed of the undesirable impurities and the refined oil phase contains said ester.

8. In a process of refining olive oil containing dissolved undesirable impurities, in which process the oil is mixed with water, and then the aqueous phase is separated from the oil phase by stratification and decanting, the improvement which comprises adding to the oil before mixing the said oil with the water 3 to 5% of a partial oleic acid ester of a polyalkylene oxide derivative of a propylene glycol glucoside wherein the number of free hydroxyl groups exceeds the number of fatty acid groups, said alkylene group containing 2 to 4 carbon atoms, whereby the glyceride oil is more readily and thoroughly freed of the undesirable impurities and the refined oil phase contains said ester.

THEODORE H. RIDER.
SOLOMON D. GERSHON.

REFERENCES CITED

The following references are of record in the file of this patent:

FOREIGN PATENTS

| Number | Country | Date |
| --- | --- | --- |
| 58,182 | Sweden | Nov. 21, 1921 |

OTHER REFERENCES

Publication: "Spans and Tweens," Atlas Powder Co., 1942, pages 5 and 6.